United States Patent

Smith

[15] 3,704,997
[45] Dec. 5, 1972

[54] VARIABLE AMPLITUDE POLARIZING BEAM SPLITTER

[72] Inventor: Luther W. Smith, Brimfield, Mass.

[73] Assignee: American Optical Corporation, Southbridge, Mass.

[22] Filed: May 19, 1971

[21] Appl. No.: 144,922

[52] U.S. Cl. .................. 350/157, 350/147, 350/159
[51] Int. Cl. ................................................ G02f 1/24
[58] Field of Search ......... 350/150, 157, 159, DIG. 2, 350/14, 15, 147

[56] References Cited

UNITED STATES PATENTS

| | | | |
|---|---|---|---|
| 3,520,592 | 7/1970 | Leib et al. | 350/159 |
| 3,484,151 | 12/1969 | Turner | 350/159 |
| 3,399,591 | 9/1968 | Drougard et al. | 350/159 |

OTHER PUBLICATIONS

Horton, "Conical Refraction Scanner" IBM Tech. Discl. Bull. Vol. 6, No. 12 (May 1964) pp. 57-58

*Primary Examiner*—David Schonberg
*Assistant Examiner*—Paul R. Miller
*Attorney*—William C. Nealon, Robert J. Bird and Bernard L. Sweeney

[57] ABSTRACT

A birefringence polarizer divides incident light into two emergent, mutually perpendicularly polarized beams. The incident light is linearly polarized, its azimuth of polarization being rotatable by a rotatable half-wave retardation plate. A similar plate in the path of one of the emergent beams controls its azimuth of polarization. The emergent light beams are thus controllable as to relative intensity and directions of polarization.

4 Claims, 2 Drawing Figures

PATENTED DEC 5 1972

3,704,997

INVENTOR

Luther W. Smith

By Robert J. Bird
Attorney 3,704,997

VARIABLE AMPLITUDE POLARIZING BEAM SPLITTER

BACKGROUND OF THE INVENTION

The present invention relates to a light beam splitter, and in particular to a beam splitter providing variable amplitude and polarization of the light beams emerging therefrom.

One environment in which this invention might find application is in the field of holography. In holography, beam splitters are used to produce two mutually coherent emergent light beams from a single incident light beam. The relative intensities of the two emergent beams are fixed by the characteristic of the beam splitter. That is, beam splitters known to the prior art are capable of reflecting and transmitting in a certain characteristic ratio. It is desirable, to provide greater flexibility in a holographic apparatus, to provide different ratios of intensity of the two emergent beams (object and reference beams) from the beam splitter. An application of this invention to holography is described in applicant's copending application, Ser. No. 144,762 filed concurrently herewith.

SUMMARY OF THE INVENTION

It is an object of this invention to provide a beam splitter in which the intensities of the emergent beams are variable.

It is another object of this invention to provide a beam splitter in which the planes of vibration of the emergent linearly polarized beams are variable.

Briefly, the present invention is practiced in one form by birefringence polarizer disposed in the path of linearly polarized incident light. The birefringence polarizer divides the incident beam into two mutually perpendicularly polarized emergent beams. A half-wave retardation plate in the path of the incident light is rotatable to vary the azimuth of polarization of the light incident on the birefringence polarizer. The relative intensities of the emergent beams are thus controllable. A half-wave plate in the path of one of the emergent beams controls its azimuth of polarization and in turn the relative directions of polarization of the two emergent beams.

DRAWING

Other objects, advantages and features of this invention may become apparent from the following description taken in connection with the accompanying drawing.

DESCRIPTION

Figure 1:
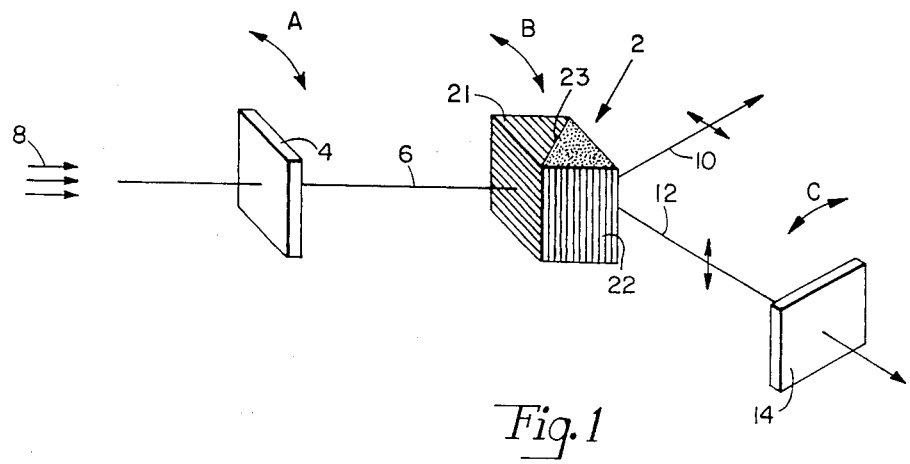
FIG. 1 is an optical diagram of a beam splitter according to this invention.

Referring now to FIG. 1, a birefringence polarizer is generally shown at 2 and is disposed, with a half-wave retardation plate 4 along an optical axis 6. Birefringence polarizer 2 may be any one of several known types including the Wollaston, Rochon, and Nicol prisms. The one illustrated in FIG. 1 is a Wollaston prism including segments 21 and 22 joined at interface 23. The optic axes of segments 21 and 22 are in the directions illustrated by the lines and are mutually perpendicular. Birefringence polarizer 2 and half-wave plate 4 are mounted so as to be rotatable about axis 6.

Linearly polarized light, represented by the arrows 8, is directed along axis 6, through half-wave plate 4, onto the birefringence polarizer 2. The azimuth of polarization of incident light 8 is rotatable by rotation of the half-wave plate about axis 6, as represented by the arcuate arrow A. The birefringence polarizer 2 effects the splitting of incident beam 8 into two mutually perpendicularly polarized emergent beams 10 and 12. The relative intensities of emergent beams 10 and 12 depend on the azimuth of polarization of incident light 8 as it strikes the birefringence beam splitter 2. Beam splitter 2 is also mounted for rotation about axis 6 as indicated by arcuate arrow B.

A half-wave retardation plate 14 is disposed in the path of one of the emergent beams, for example 12, and is also rotatably mounted about the axis of beam 12 as indicated by the arcuate arrow C.

Figure 2:
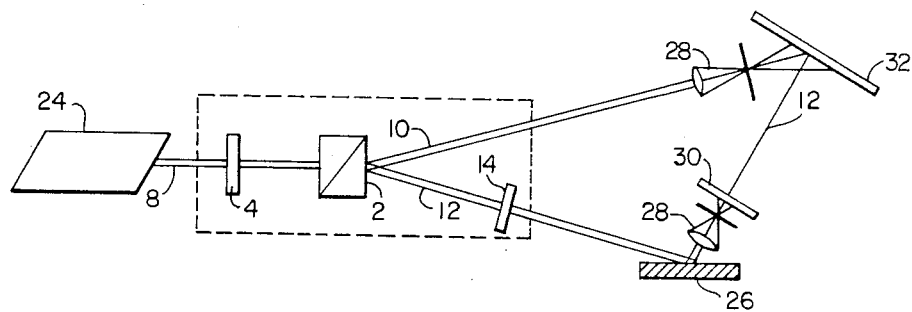
FIG. 2 is an optical diagram of a holographic apparatus employing the beam splitter of this invention, shown within the dotted line portion of the figure.

Referring now to FIG. 2, a holographic apparatus is shown which includes this invention, indicated within the dotted lines. This apparatus includes, in addition to the above described beam splitter and half-wave plates, a coherent light source 24 from which the incident light 8 radiates. The emergent light beam 12 becomes the object beam for the holographic apparatus and is reflected from a suitable reflector 26, directed through a beam expander 28, and through an object transparency 30, then onto a hologram plate 32. Emergent beam 10 becomes the reference beam for this holography apparatus and is directed through another beam expander 28 and onto hologram plate 32 where it establishes and records the pattern of interference with the object beam 12.

This holography arrangement is more fully described in applicant's co-pending application Ser. No. 144,762, filed concurrently herewith.

In the use of this invention, as described with reference to FIG. 1 and as used for example in a combination as shown in FIG. 2, an incident beam of light may be divided into two components. These components are variable as to intensity and their intensity ratio is likewise variable. The emergent beams, normally mutually perpendicularly polarized, are each variable as to their azimuth of polarization, and likewise the relative difference of the azimuth of polarization of the two beams is variable.

It may occur to others to make modifications of this invention which will lie within its concept and scope and not constitute a departure. Accordingly, it is intended that the invention be not limited by any of the details of its description but only by the following claims.

What is claimed is:

1. A light beam splitter capable of providing two light beams of different intensities, including, in optical alignment:

a birefringent medium, azimuth control means to vary the azimuth of polarization of light incident on said birefringent medium, said birefringent medium effective to divide light incident thereon into two emergent beams, said azimuth control means effective to obtain varying intensities of said emergent beams by controlling the azimuth of polarization of the incident light.

2. A light beam splitter as defined in claim 1 further including:
a half-wave retardation plate disposed in the path of, and rotatable about the axis of propagation of, one of said emergent beams to control the azimuth of polarization thereof.

3. A light beam splitter as defined in claim 1 in which said azimuth control means is a half-wave retardation plate rotatable about the axis of propagation of the light incident on said birefringent medium,
said beam splitter further including a half-wave retardation plate disposed in the path of, and rotatable about the axis of propagation of, one of said emergent beams to control the azimuth of polarization thereof.

4. A light beam splitter as defined in claim 3 in which said birefringent medium is rotatable about the axis of propagation of the light incident thereon.

* * * * *